(12) United States Patent
Benjamin et al.

(10) Patent No.: US 7,213,132 B2
(45) Date of Patent: *May 1, 2007

(54) SYSTEM AND METHOD FOR PROVIDING PREDICATE DATA TO MULTIPLE PIPELINE STAGES

(75) Inventors: Gary J Benjamin, Fort Collins, CO (US); Donald Charles Soltis, Jr., Fort Collins, CO (US); Ronny Lee Arnold, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 679 days.

This patent is subject to a terminal disclaimer.

(21) Appl. No.: 10/648,960

(22) Filed: Aug. 27, 2003

(65) Prior Publication Data

US 2004/0123082 A1    Jun. 24, 2004

Related U.S. Application Data

(63) Continuation of application No. 09/490,395, filed on Jan. 24, 2000, now Pat. No. 6,622,238.

(51) Int. Cl.
*G06F 9/38* (2006.01)
(52) U.S. Cl. ...................... 712/226; 712/219
(58) Field of Classification Search ................ 712/226, 712/216–219
See application file for complete search history.

(56) References Cited

U.S. PATENT DOCUMENTS 5,859,999 A    1/1999    Morris et al.
5,860,017 A    1/1999    Sharangpani et al.
6,353,883 B1    3/2002    Grochowski et al.
6,442,678 B1 *    8/2002    Arora ......................... 712/218
6,622,238 B1 *    9/2003    Benjamin et al. ........... 712/226

OTHER PUBLICATIONS

Alexander Wolfe, "Patents Shed Light on Merced: Techniques of Predication and Speculation Detailed," Electronic Engineering Times, Feb. 15, 1999, pp. 43-44.
Patterson, et al., "Computer Architecture: A Quantitative Approach," Morgan Kaufmann Publishers, Inc., 2ed, pp. 150-193,1996.
Gary Lauterbach, "Sun's Next-Generation High-End SPARC Microprocessor," Microprocessor Forum, Oct. 14-15, 1007, pp. 3-6.

* cited by examiner

*Primary Examiner*—Donald Sparks
*Assistant Examiner*—Tonia L Meonske

(57) ABSTRACT

A processing system provides predicate data that indicates whether instructions processed by a processor pipeline should be executed by the pipeline. In architecture, the system of the present invention utilizes a register, a pipeline, and predicate circuitry. The pipeline includes a first stage and a second stage for processing instructions of a computer program. The predicate circuitry is configured to read a first predicate value from the register and to receive a second predicate value. The predicate circuitry may transmit the first predicate value read from the register to the first stage and then select between the first predicate value and the second predicate value. The predicate value selected by the predicate circuitry is transmitted to the second stage.

16 Claims, 7 Drawing Sheets

SYSTEM AND METHOD FOR PROVIDING PREDICATE DATA TO MULTIPLE PIPELINE STAGES

CROSS REFERENCE TO RELATED APPLICATION

This application is a continuation of Ser. No. 09/490,395, now U.S. Pat. No. 6,622,238, entitled "System and Method for Providing Predicate Data," and filed on Jan. 24, 2000.

BACKGROUND OF THE INVENTION

1. Field of the Invention

The present invention generally relates to data processing and, in particular, to a system and method for efficiently providing predicate data that defines whether instructions processed by a processor pipeline should be executed by the pipeline.

2. Related Art

To improve performance of conventional computer systems, superscalar processors capable of pipeline processing have been developed. Such processors typically utilize a plurality of pipelines to process and execute instructions of a computer program. Each of the pipelines is capable of simultaneously processing a plurality of instructions. Therefore, such superscalar processors have the capability of quickly processing and executing a relatively large number of instructions.

It is well known that each instruction of a computer program is not necessarily executed during each run of the computer program. In this regard, many instructions are executed only if certain conditions are true. However, as the program runs, many of the instructions that should not be executed are input into the pipelines and processed by the pipelines. For example, consider a situation in which execution of a program should branch to one of two portions of the program based on the results of the execution of a compare instruction. In such a situation, it is generally desirable to input instructions from both portions of the program into the pipelines, which begin processing the instructions. However, only the instructions associated with one of the portions, depending on the execution results of the compare instruction, should be executed by the pipelines. The instructions in the other portion should pass through the pipelines without execution.

To enable such selective execution of instructions, each instruction is associated with a predicate register containing a predicate value that indicates whether or not the instruction is enabled. Although the predicate value can have various lengths, the predicate value is usually one bit of information. If asserted, the predicate value indicates that instructions associated with the predicate register are presently enabled and, therefore, should be executed. If deasserted, the predicate value indicates that instructions associated with the predicate register are presently disabled and, therefore, should not be executed.

In the example described hereinbefore, once the aforementioned compare instruction is executed and it is, therefore, known which portion of the program should execute, the predicate values contained in the registers associated with the instructions in the portion of the program that should execute are asserted, and the predicate values contained in the registers associated with the instructions in the portion of the program that should not execute are deasserted.

Furthermore, during the processing of the instructions in both portions of the program, the predicate values contained in the registers associated with the instructions are analyzed to determine whether each of the instructions is enabled. If the predicate data indicates that an instruction is enabled (i.e., the value in the predicate register associated with the instruction is asserted), then the instruction is executed by the pipeline processing the instruction. However, if the predicate data indicates that the instruction is disabled (i.e., the value in the predicate register associated with the instruction is deasserted), then the instruction is not executed by the pipeline processing the instruction. Accordingly, by maintaining and analyzing predicate data, the instructions in one of the aforementioned portions of the program can be executed by the pipelines, while the instructions in the other portion can pass through the pipelines without execution.

While the instructions are being processed by the pipelines, the predicate data can also be used to resolve data hazards. For example, it is well known that when an instruction is dependent on data that is not yet available, the instruction should be stalled before execution to prevent data dependency errors. Once the necessary data becomes available, the stall can be removed and the instruction can then be allowed to execute.

Although stalling prevents errors, the stalling of instructions increases the amount of time required to process the instructions. To minimize the adverse effects of stalls, the predicate value contained in a predicate register associated with an instruction that should otherwise be stalled can be analyzed to determine whether or not the instruction is enabled. If the instruction is disabled, then the instruction does not need to be stalled, since the instruction will not be executed and, therefore, will not cause an error. As a result, the predicate data can be used to prevent or remove unnecessary stalls and, therefore, to increase the performance of a processor.

The predicate registers are usually maintained in a register file that includes write and read ports to enable predicate data to be written to and read from the appropriate predicate register. The register file serves as a central location for storage of all of the predicate values utilized by the processing system. Therefore, when the predicate status of any instruction is needed by a portion of any of the pipelines, the predicate value contained in the predicate register associated with the instruction can be read from the register file. However, the write and read ports of the register file are relatively expensive in terms of area, wires, and often processor speed, and it is, therefore, desirable to minimize the number of write and read ports needed to write to and read from the register file.

Furthermore, the predicate value contained in a predicate register associated with an instruction of a program can be changed during execution of the program, as it becomes known which instructions should and should not execute as the program runs. To minimize delays in the pipelines, it is desirable for the circuitry of the pipelines to quickly receive any updates to the predicate data. However, writing and reading predicate values into and out of the register file utilizes a relatively significant amount of time (on the order of one or more clock cycles), thereby increasing the delay in notifying the circuitry of a change in the predicate data.

Thus, a heretofore unaddressed need exists in the industry for providing a system and method of efficiently providing predicate data to indicate whether instructions being processed by a processor should be executed.

SUMMARY OF THE INVENTION

The present invention overcomes the inadequacies and deficiencies of the prior art as discussed hereinbefore. The present invention generally relates to a system and method for efficiently providing predicate data that defines whether or not instructions processed by a processor pipeline should be executed by the pipeline.

In architecture, the system of the present invention utilizes a register, a pipeline, and predicate circuitry. The pipeline includes a first stage and a second stage for processing instructions of a computer program. The predicate circuitry is configured to read a first predicate value from the register and to receive a second predicate value. The predicate circuitry may transmit the first predicate value read from the register to the first stage and then select between the first predicate value and the second predicate value. The predicate value selected by the predicate circuitry is transmitted to the second stage.

If the instruction in the second stage is stalled, then the predicate value transmitted to the second stage is continuously selected and transmitted to the second stage for the duration of the stall, unless a new predicate value indicative of the predicate status of the instruction is received. If such a new predicate value is received, the new predicate value is selected and transmitted to the second stage instead.

The present invention can also be viewed as providing a method for processing instructions of a computer program. The method can be broadly conceptualized by the following steps: providing a pipeline having a first stage and a second stage; producing a predicate value; writing the predicate value to a register; receiving an instruction; receiving a control signal; reading the predicate value from the register based on a register identifier included in the instruction; transmitting the predicate value read in the reading step to the first stage of the pipeline; processing the instruction via the first stage of the pipeline based on the predicate value transmitted to the first stage; receiving a new predicate value; selecting, based on the control signal, between the new predicate value and the predicate value read in the reading step; transmitting the predicate value selected in the selecting step to the second stage of the pipeline; and processing the instruction via the second stage based on the predicate value selected in the selecting step.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

Figure 1:
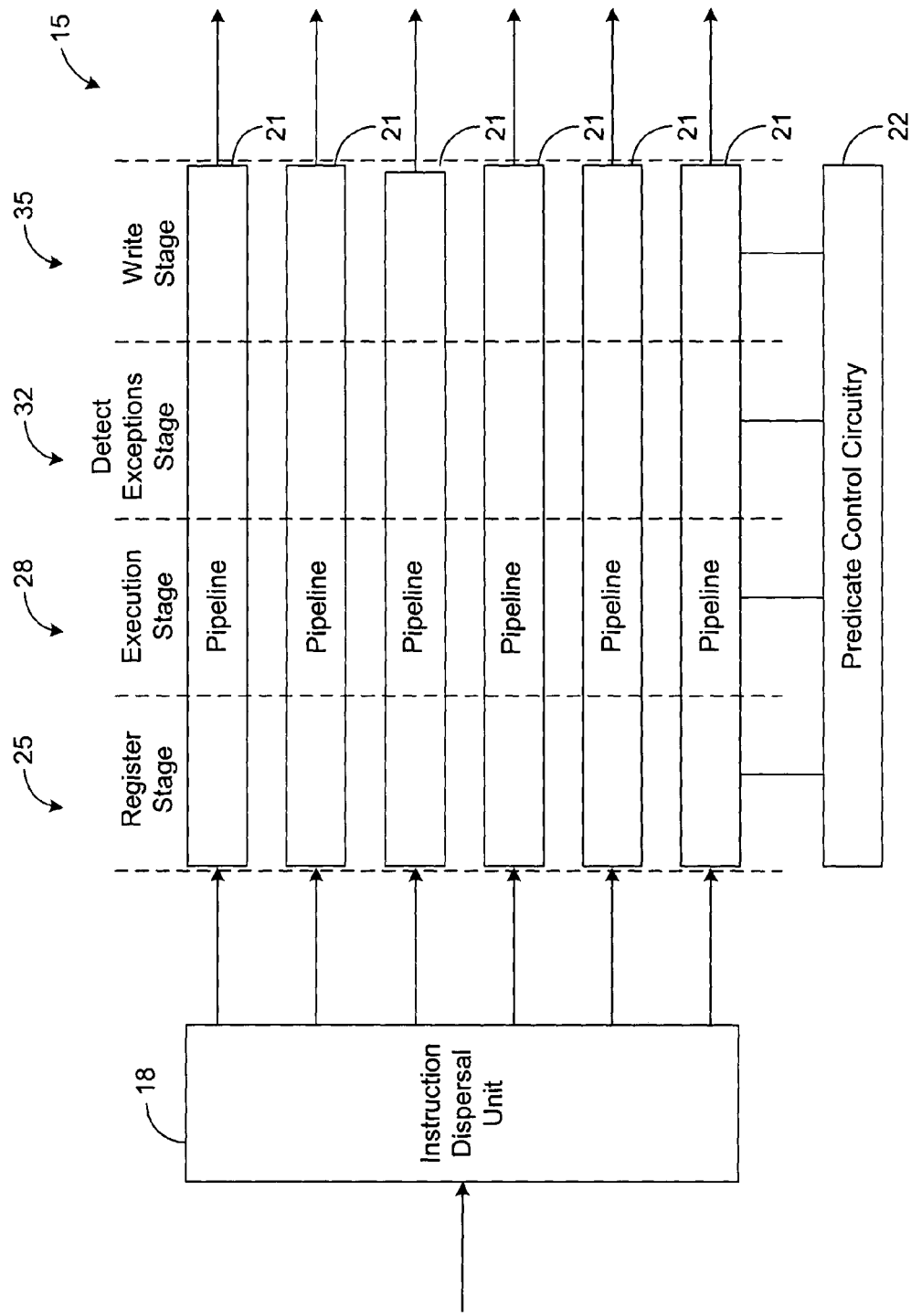
FIG. 1 is a block diagram illustrating a conventional processing system.

The present invention generally relates to a system and method for efficiently providing predicate data to indicate whether or not instructions of a computer program should be executed. To illustrate the principles of the present invention, refer to FIG. 1, which depicts a conventional superscalar processing system 15. The processing system 15 includes an instruction dispersal unit 18 that receives instructions of a computer program and assigns each instruction to one of a plurality of pipelines 21. Each pipeline 21 is configured to process each instruction received by the pipeline 21.

Each pipeline 21 is usually configured to only process particular types of instructions (e.g., integer operation, floating point operation, memory operation, etc.). Therefore, the instruction dispersal unit 18 is configured to assign each instruction only to a pipeline 21 compatible with the instruction. Furthermore, although predicate control circuitry 22 is shown for simplicity as being coupled to one pipeline 21 in FIG. 1, it should be noted that each pipeline 21 is similarly coupled to the predicate control circuitry 22.

As shown by FIG. 1, pipelines 21 typically process instructions in stages. As used herein, a "stage" is any portion of a pipeline 21 that processes instructions and that includes a latch at its input so that the timing of the data input to the stage can be controlled in response to edges of a clock signal. The pipelines 21 shown by FIG. 1 process the instructions in four stages: a register stage 25, an execution stage 28, a detect exceptions stage 32, and a write stage 35. In other embodiments, it is possible for the processing system 15 to process instructions in other types and combinations of stages.

In the system 15 shown by FIG. 1, an instruction received by one of the pipelines 21 is first processed in a register stage 25, in which any operands necessary for the execution of the instruction are obtained. Once the operands have been obtained, the instruction enters the execution stage 28, which executes the instruction, if appropriate. After the instruction has been processed in the execution stage 28, the instruction enters a detect exceptions stage 32, which checks conditions, such as overruns during execution, for example, that may indicate data unreliability. After the detect exceptions stage 32 is completed, the instruction enters a write stage 35, which writes the results of the execution stage 28 to a register or a location in memory.

Typically, each stage 25, 28, 32, and 35 of the pipelines 21 processes only one instruction at a time, and the stages 25, 28, 32 and 35 may simultaneously process their respective instruction such that each pipeline 21 is capable of processing multiple instructions. For example, in the system 15 shown by FIG. 1, it is possible for one of the pipelines 21 to simultaneously process four instructions, in which each stage 25, 28, 32, and 35 of the pipeline 21 is processing one of the four instructions. Furthermore, each pipeline 21 may process instructions as other pipelines 21 are processing other instructions. Therefore, it is possible to simultaneously process a relatively large number of instructions via the system 15 shown by FIG. 1.

To control timing, the instructions are typically stepped through the stages 25, 28, 32, and 35 in response to edges of a clock signal. For example, an instruction in the write stage 35 may step out of a pipeline 21 on the same clock edge that instructions in the register stage 25, the execution stage 28, and the detect exceptions stage 32 respectively step into the execution stage 28, the detect exceptions stage 32, and the write stage 35 of the same pipeline 21. However, it is not necessary for each instruction in a pipeline 21 to step into the next stage on the same edge of the clock signal. In fact, while some of the instructions of a pipeline 21 are stepped through the pipeline 21, other instructions of the pipeline 21 may be stalled (i.e., temporarily prevented from stepping out of a stage) to prevent certain errors from occurring. U.S. Patent Application entitled "Superscalar Processing System and Method for Efficiently Performing In-Order Processing of Instructions," assigned Ser. No. 09/390,199, and filed on Sep. 7, 1999, which is incorporated herein by reference, describes a process for selectively stalling instructions to prevent data errors.

Figure 2:
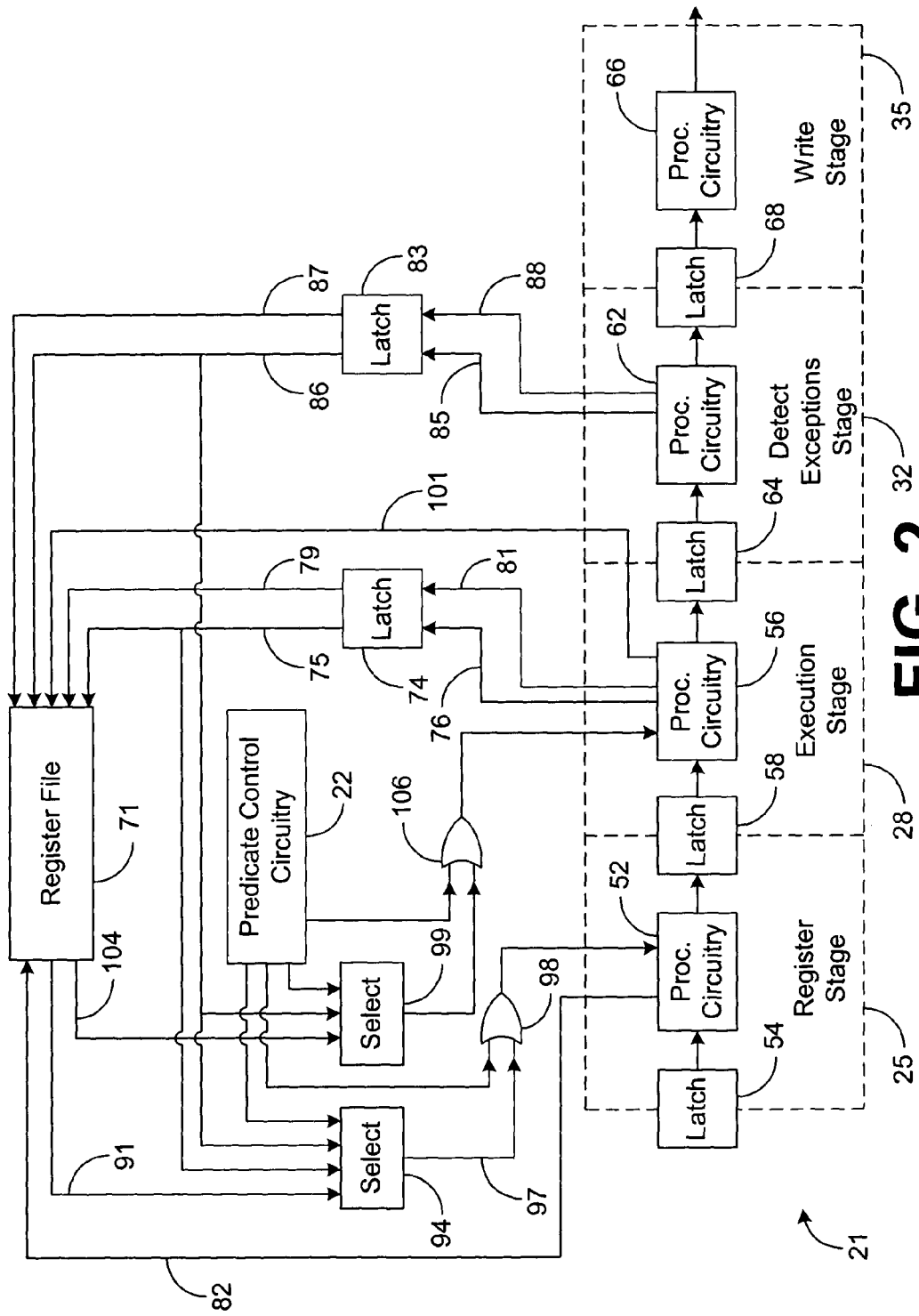
FIG. 2 is a block diagram illustrating a more detailed view of a processing pipeline depicted in FIG. 1.

FIG. 2 shows a more detailed view of one of the pipelines 21 to illustrate the circuitry typically used to step an instruction through the pipelines 21. In this regard, an instruction is latched and provided to processing circuitry 52 via latch 54 in response to an active edge of the clock signal. Once processing in the processing circuitry 52 is complete, the instruction is latched and provided to processing circuitry 56 via latch 58 in response to an active edge of the clock signal. Once processing in the processing circuitry 56 is complete, the instruction is latched and provided to processing circuitry 62 via latch 64 in response to an active edge of the clock signal. Once processing in the processing circuitry 62 is complete, the instruction is latched and provided to processing circuitry 66 via latch 68 in response to an active edge of the clock signal. Once processing in the processing circuitry 66 is complete, the instruction exits the pipeline 21.

The processing circuitry 52, 56, 62, and 66 respectively perform the functionality described hereinbefore for the stages 25, 28, 32, and 35. In this regard, the processing circuitry 52 obtains operands, the processing circuitry 56 executes the instruction, the processing circuitry 64 checks for exceptions, and the processing circuitry 66 writes data produced via execution of the instruction into a register or location in memory. The instruction may be temporarily stalled in any one of the stages 25, 28, 32, or 35 to enable a data dependency hazard to be resolved or to prevent one instruction from stepping into a stage that has yet to finish processing an earlier instruction.

As shown by FIG. 2, the system 15 includes a predicate register file 71 that stores predicate data for the instructions processed by the system 15. Although, the register file 71 is shown for simplicity as coupled to a single pipeline 21 in FIG. 2, the register file 71 in the preferred embodiment is similarly coupled to each pipeline 21 of the system 15.

Figure 3:
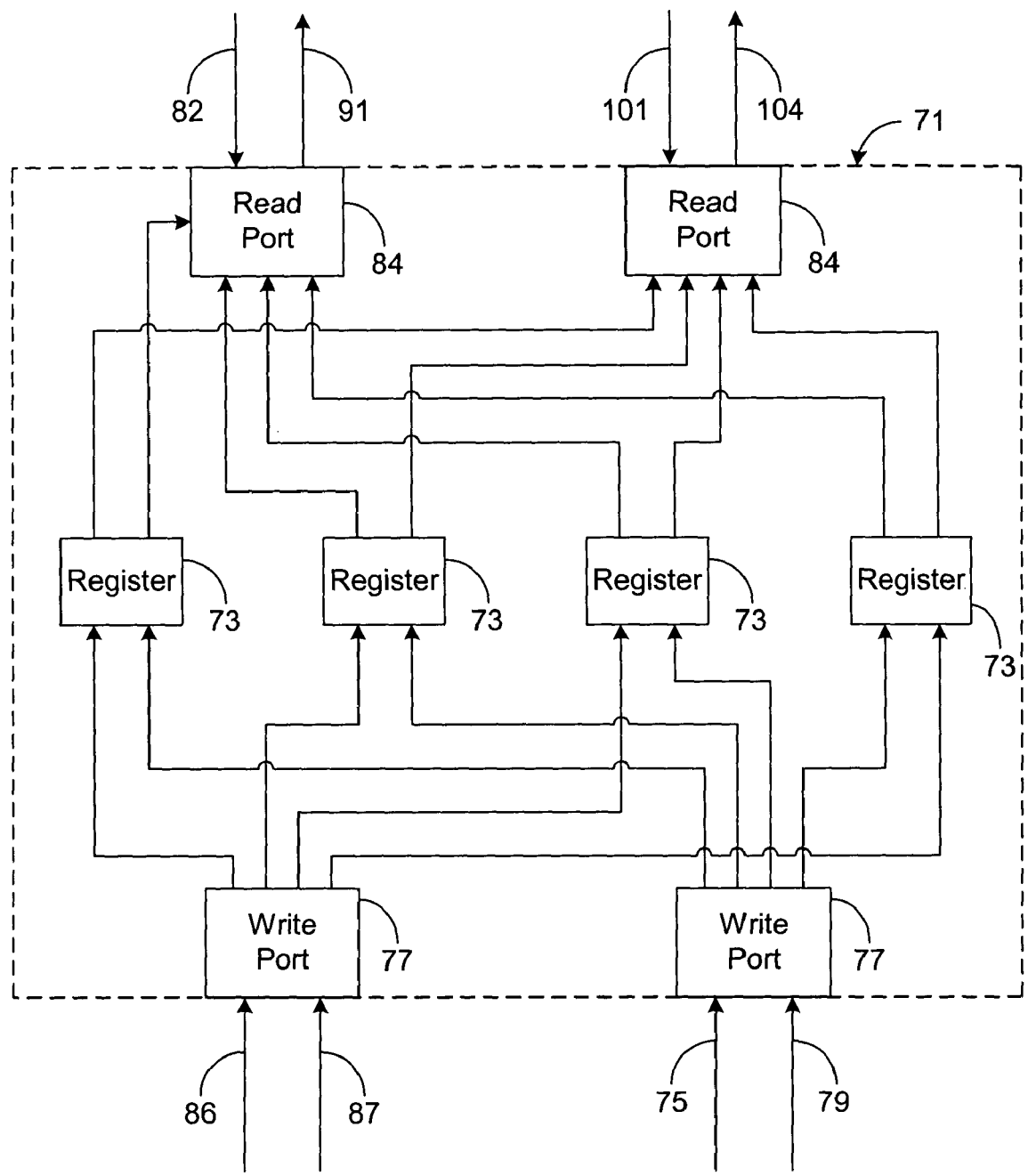
FIG. 3 is a block diagram illustrating a more detailed view of a register file depicted in FIG. 2.

As shown by FIGS. 2 and 3, the register file 71 includes a plurality of registers 73. Each register 73 contains a predicate bit indicating whether an instruction correlated with the register 73 should execute. Through techniques known in the art, instructions being processed in the execution stage 28, detect exceptions stage 32, and/or write stage 35 of any of the pipelines 21 sometimes produce predicate data that is used to control the bits in the predicate register file 71. For example, when executed, a first instruction in the execution stage 28 of one of the pipelines 21 may produce a predicate value that is to be written to a particular register 73 in the register file 71. The data defining the instruction includes a register identifier that identifies the particular register 73. When the instruction is executed, the processing circuitry 56 (FIG. 2) transmits the predicate value to the register file 71 via latch 74 and connections 75 and 76 and transmits the foregoing register identifier to the register file 71 via latch 74 and connections 79 and 81. The write port 77 coupled to the latch 74 receives the predicate value and the register identifier and transmits the predicate value to the register 73 identified by the received register identifier. The particular register 73 that receives the predicate value updates the value contained in the register 73 based on the received predicate value.

Any of the other stages 25, 32, and/or 35 that may produce predicate data are similarly coupled to the register file 71, so that the register file 71 may receive and appropriately process the predicate data. For example, the detect exceptions stage 32 in FIG. 2 is coupled to the register file 71 such that the processing circuitry 62 may transmit a new predicate data bit produced in processing circuitry 62 to the register file 71 via latch 83 and connections 85 and 86. Furthermore, the register identifier identifying the register 73 (FIG. 3) where the new predicate bit should be written may be transmitted to register file 71 via latch 83 and connections 86 and 87. Although not shown by FIG. 2, any of the stages 25, 28, 32, and/or 35 of any other pipeline 21 may be similarly coupled to the register file 71 so that the register file 71 may receive predicate data from the stages 25, 28, 32 and/or 35 of other pipelines 21.

Each instruction processed by the system 15 is correlated with one of the registers 73 located in the predicate register file 71. In this regard, the data defining an instruction includes a predicate register identifier identifying the register 73 correlated with the instruction. The predicate value contained in the correlated register 73 while the instruction is being processed by one of the pipelines 21 indicates whether or not the instruction is enabled. If the instruction is enabled, then the instruction should be executed. If the instruction is disabled, then the instruction should pass through the pipeline 21 without executing.

The predicate value contained in the register 73 correlated with the instruction may be utilized to process the instruction in any of the stages 25, 28, 32, and/or 35. For example, not only may the predicate value in the correlated register 73 be used to determine whether or not to execute the instruction when the instruction enters the execution stage 28, but the predicate value may also be used to resolve data hazards. In this regard, an instruction in the register stage 25 may utilize, when later executed in the execution stage 28, data that is not presently available. Until the data utilized by the instruction becomes available, the instruction should be prevented from executing in order to prevent data errors. Therefore, until the aforementioned data becomes available, the instruction should be stalled in the register stage 25, unless it can be determined that the instruction is disabled (i.e., will not execute when the instruction enters the execution stage 28).

In this regard, the processing circuitry 52 may utilize the predicate value contained in the correlated register 73 of the predicate register file 71 to determine whether the instruction is enabled or disabled. To this end, the processing circuitry 52 transmits the instruction's predicate register identifier to the register file 71 via connection 82. This identifier is received by a read port 84 (FIG. 3), which is designed to read the predicate value in the register 73 identified by the received predicate register identifier. This predicate value may then be returned to the processing circuitry 52, which determines whether the instruction is enabled or disabled based on the received predicate value. If the processing circuitry 52 determines, based on the predicate value read from the register file 71, that the instruction is disabled (i.e., will not be executed in the execution stage 28), then the processing circuitry 52 can prevent the stalling of the instruction in the register stage 25 and, thereby, increase the overall efficiency of the system 15.

It should be noted that to enable each stage 25, 28, 32, and/or 35 of each pipeline 21 to utilize the predicate data contained in the register file 71, the register file 71 includes a separate read port 84 for each stage 25, 28, 32, and/or 35 of each pipeline 21. Therefore, in superscalar processors, the number of read ports 84 can become quite large, thereby utilizing a relatively large amount of area in the system 15 and increasing the wiring and complexity of the system 15.

In some situations, the predicate value transmitted from the register file 71 to the processing circuitry 52 may need to be updated before being received by processing circuitry 52. In this regard, there is usually a finite amount of delay in writing to and reading from the register file 71. Therefore, when a predicate value from a particular register 73 in the register file 71 is transmitted across connection 91, there may already be a new predicate value on connection 75 or 86 that will later update or change the value contained in the particular register 73, once the new predicate value is received and processed by the register file 71. As a result, the value presently transmitted across connection 91 is obsolete. Accordingly, connection 91 is coupled to select circuitry 94, which is configured to update the predicate value transmitted across connection 91, if necessary.

In this regard, the select circuitry 94 is coupled to connections 75 and 86 in addition to connection 91 and, therefore, receives the new predicate values transmitted across connections 75 and 86, as well as the predicate value read from the register file 71 and transmitted across connection 91. The select circuitry 94 selects and transmits across connection 97 the value received from connection 91, unless any of the new predicate values presently on connections 75 or 86 are destined for the same register 73 that produced the value received from connection 91. When the value from connection 91 has been read from the same register 73 that a new value on connection 75 or 86 is destined, the select circuitry 94 is configured to select and transmit across connection 97 the new value instead of the value received from connection 91. As a result, the value transmitted across connection 97 reflects the predicate status of the instruction in the register stage 25 based on the most recent predicate data available.

It should be noted that select circuitry 94 is shown in FIG. 2 as only receiving input from one pipeline 21 for simplicity. However, since any stage 25, 28, 32, and/or 35 of any pipeline 21 may produce predicate data, the select circuitry 94 is similarly coupled to other pipelines 21 and/or other stages 25 and/or 35 capable of producing predicate data, so that the select circuitry 94 may receive and select from each new predicate value being presently transmitted to register file 71. Therefore, the value selected by select circuitry 94 may be a new predicate value produced by a pipeline 21 not shown by FIG. 2.

To enable the select circuitry 94 to select the appropriate bit value for transmission across connection 97, the predicate control circuitry 22 transmits a control signal to select circuitry 94 indicating which value received by select circuitry 94 should be selected. As previously set forth, the predicate control circuitry 22 is coupled to each stage 25, 28, 32, and/or 35 of each pipeline 25. The predicate control circuitry 22 analyzes the register identifiers identifying the registers 73 where the predicate data produced by the instructions should be written. Therefore, the predicate control circuitry 22, by analyzing the foregoing register identifiers and the register identifier transmitted across connection 82, can detect when the new predicate data presently on connections 75 or 86 is destined for the same register 73 that produced the predicate value presently received by the select circuitry 94 from connection 91.

In some situations, the predicate value selected by the select circuitry 94 for transmission across connection 97 may be unreliable. For example, in analyzing the predicate register identifiers of the instructions in the pipelines 21, the predicate control circuitry 22 may detect that an instruction being processed by one of the pipelines 21 may later produce predicate data that may affect the predicate status of the instruction in the register stage 25. As a result, the instruction in the register stage 25 ultimately may execute regardless of the values presently transmitted across connections 75, 86, and 91, and to ensure that no data errors occur, it should be assumed that the instruction will execute.

Therefore, when the predicate control circuitry 22 detects that predicate data produced by an instruction may later change the predicate status of the instruction presently in the register stage 25, the predicate control circuitry 22 transmits an asserted control signal, referred to as a "pessimistic signal" or a "pessimistic control signal," to OR gate 98. Otherwise, the pessimistic control signal transmitted to OR gate 98 by control circuitry 22 is deasserted. Consequently, the output of OR gate 98 indicates that the instruction in the register stage 25 is enabled when the value presently selected by update circuitry 94 is asserted (i.e., indicates that the instruction in the register stage 25 is enabled) or when the control value transmitted from control circuitry 22 to OR gate 98 is asserted. As a result, the instruction in the register stage 25 should be processed as if it is enabled, regardless of the value selected by select circuitry 94, when the control circuitry 22 detects that another instruction may later produce predicate data that may affect the predicate status of the instruction in the register stage 25, thereby ensuring that the instruction in the register stage 25 will not cause data errors if it is further processed.

If the instruction in the register stage 25 is stalled, the foregoing process of providing a predicate value to the processing circuitry 52 is repeated during the next clock cycle. In this regard, the predicate register identifier of the instruction in the register stage 25 is transmitted to the register file 71, and the value of the register 73 identified by this identifier is read and transmitted to select circuitry 94 via connection 91. The select circuitry 94 then selects a value from connection 75, 86, or 91, based on a control signal from predicate control circuitry 22 and transmits the selected value to OR gate 98. Based on the foregoing value and the value of a pessimistic control signal from predicate control circuitry 22, the OR gate 98 transmits a value to processing circuitry 52 indicating the present predicate status of the instruction in the register stage 25.

Once processing of the instruction in the register stage 25 is completed and the instruction is latched and provided to the execution stage 28, the processing circuitry 56 in the execution stage 28 determines whether or not the instruction should be executed. In this regard, a predicate value is transmitted to processing circuitry 56 in the same manner that a predicate value is transmitted to processing circuitry 52. Accordingly, the predicate register identifier of the instruction is transmitted to the register file 71 from the processing circuitry 56 via connection 101. One of the read ports 84 (FIG. 3) reads the value of the register 73 correlated with the instruction (i.e., the value of the register 73 identified by the instruction's predicate register identifier transmitted across connection 101) and transmits this value to select circuitry 99 via connection 104.

The select circuitry 99 selects a value from connection 75, 86, or 104 based on a control signal from predicate control circuitry 22, similar to how the select circuitry 94 selects a value from connection 75, 86, or 91, as described above. The selected value is then transmitted to OR gate 106, which also receives a pessimistic control signal from predicate control circuitry 22 that is asserted when predicate data later produced by another instruction may affect the predicate status of the instruction in the execution stage 28 of the pipeline 21 shown by FIG. 2. As a result, the output of OR gate 106, when asserted, indicates that the instruction in the execution stage 28 should be processed as if it is enabled. Therefore, if the signal received from OR gate 106 is asserted, the processing circuitry 56 executes the instruction. Otherwise, the processing circuitry 56 refrains from executing the instruction and allows the instruction to pass without execution.

According to the aforementioned techniques, predicate data may be maintained and utilized to increase the performance of the processing system 15 and to properly execute the instructions input into the pipelines 21. However, as previously indicated, the read and write ports 84 and 77 (FIG. 3) in the register file 71 are relatively expensive, and it is desirable to minimize these ports as much as possible. Furthermore, the steps of writing to and reading from the register file 71 take a relatively long time. It is desirable to minimize the amount of time required to provide the stages 25, 28, 32, and/or 35 with updated predicate data in order to enhance the overall efficiency of the system 15.

Figure 4:
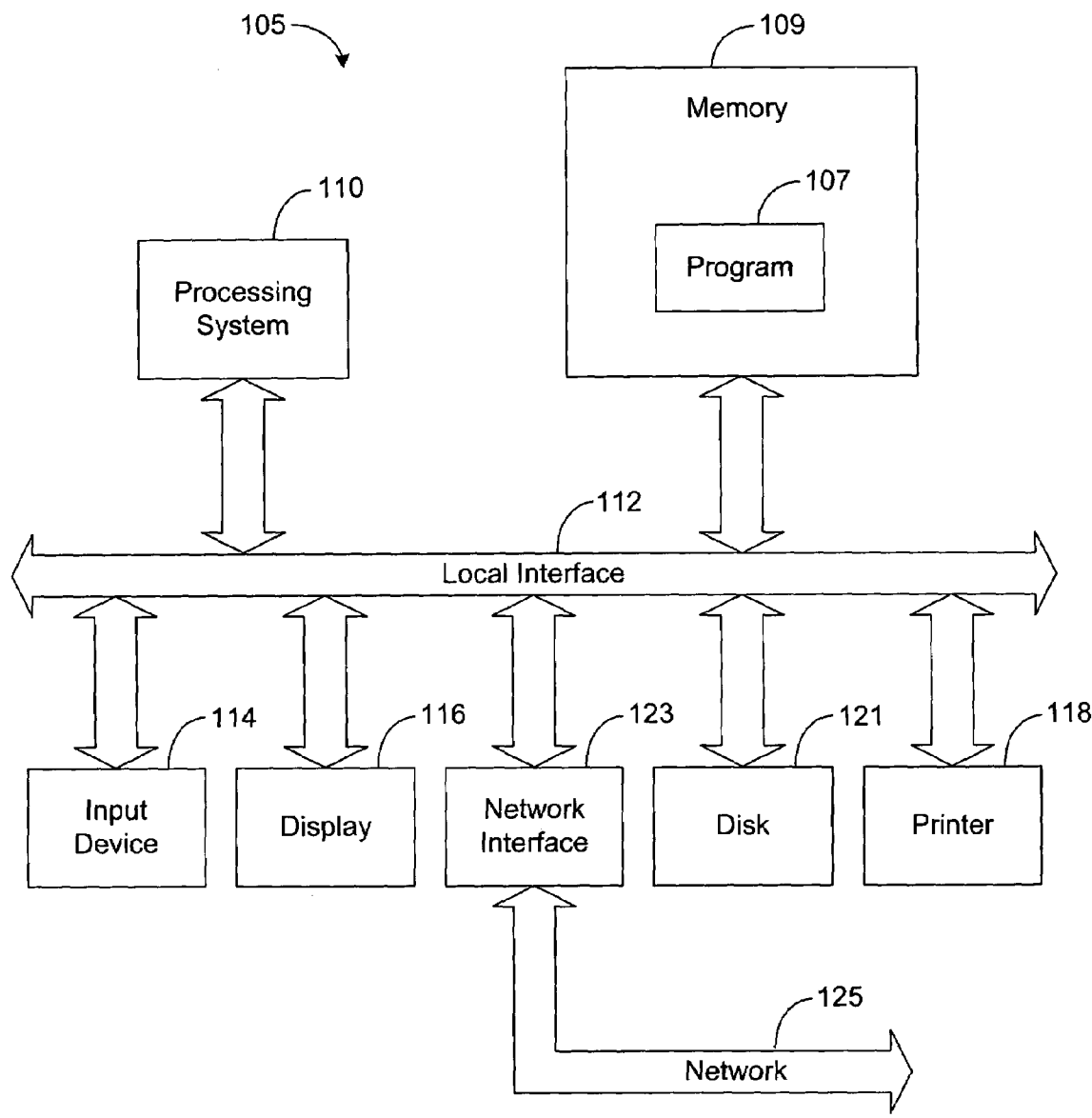
FIG. 4 is a block diagram illustrating a computer system employing a processing system in accordance with the present invention.

In general, the present invention is related to a system and method for maintaining and providing predicate data. FIG. 4 depicts a processing system 110 in accordance with the principles of the preferred embodiment of the present invention. As shown by FIG. 4, the processing system 110 may be employed within a computer system 105 for executing instructions from a computer program 107 that is stored in memory 109.

The processing system 110 communicates to and drives the other elements within the system 105 via a local interface 112, which can include one or more buses. Furthermore, an input device 114, for example, a keyboard or a mouse, can be used to input data from a user of the system 105, and screen display 116 or a printer 118 can be used to output data to the user. A disk storage mechanism 121 can be connected to the local interface 112 to transfer data to and from a nonvolatile disk (e.g., magnetic, optical, etc.). The system 105 can be connected to a network interface 123 that allows the system 105 to exchange data with a network 125.

Figure 5:
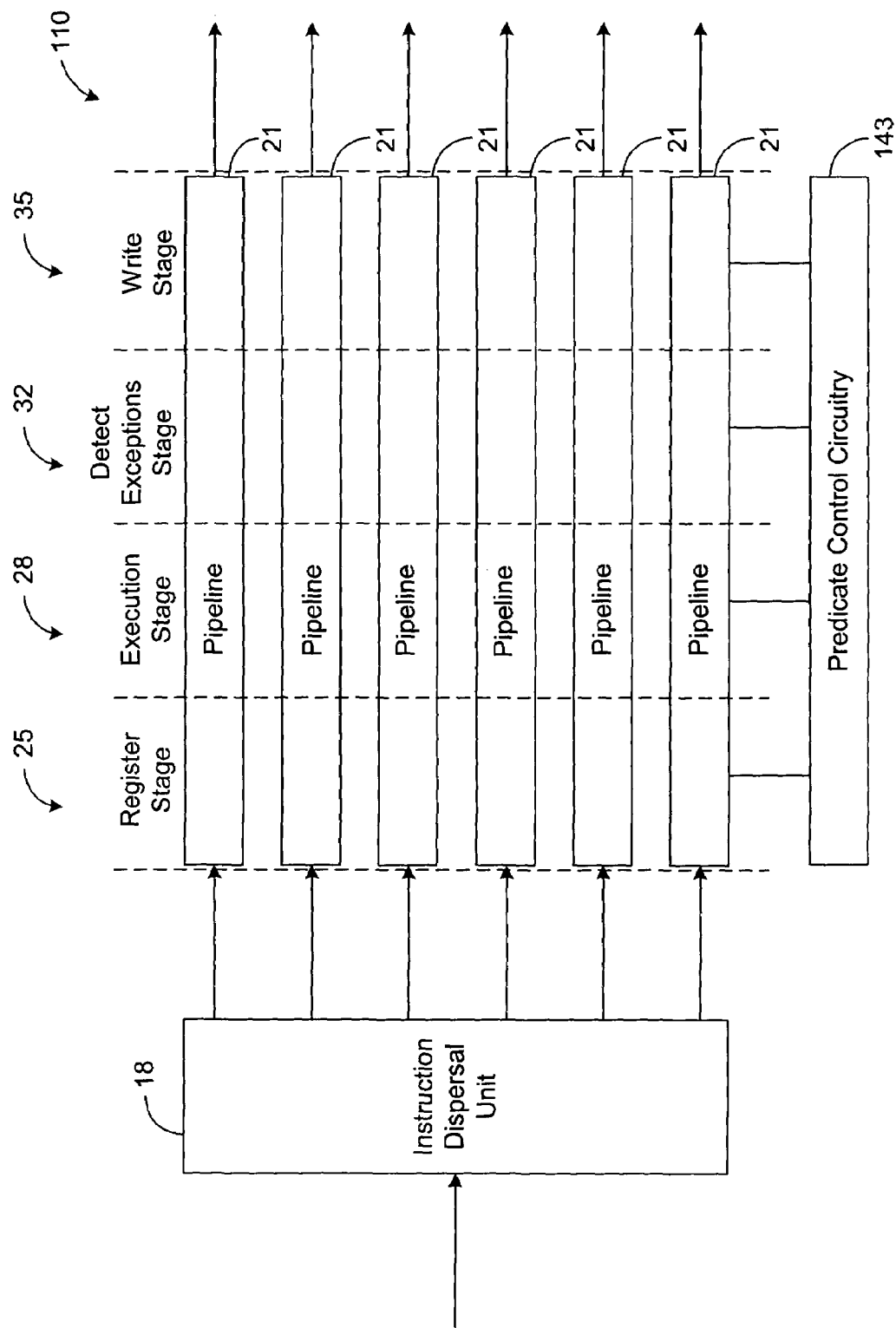
FIG. 5 is a block diagram illustrating the processing system of FIG. 4.

Other than the circuitry for processing predicate data, the configuration of the processing system 110 is preferably the same as the configuration of conventional processing system 15. Therefore, as shown by FIG. 5, the processing system 110 processes instructions via pipelines 21 in a register stage 25, an execution stage 28, a detect exceptions stage 32, and a write stage 35, as described hereinbefore for the conventional system 15. Note that it is possible to divide the processing performed by the pipelines 21 via other stages and other combinations of stages, if desired. Furthermore, although predicate control circuitry 143 is shown for simplicity as being coupled to one pipeline 21 in FIG. 5, it should be noted that each pipeline 21 is similarly coupled to the predicate control circuitry 143 in the preferred embodiment.

Figure 6:
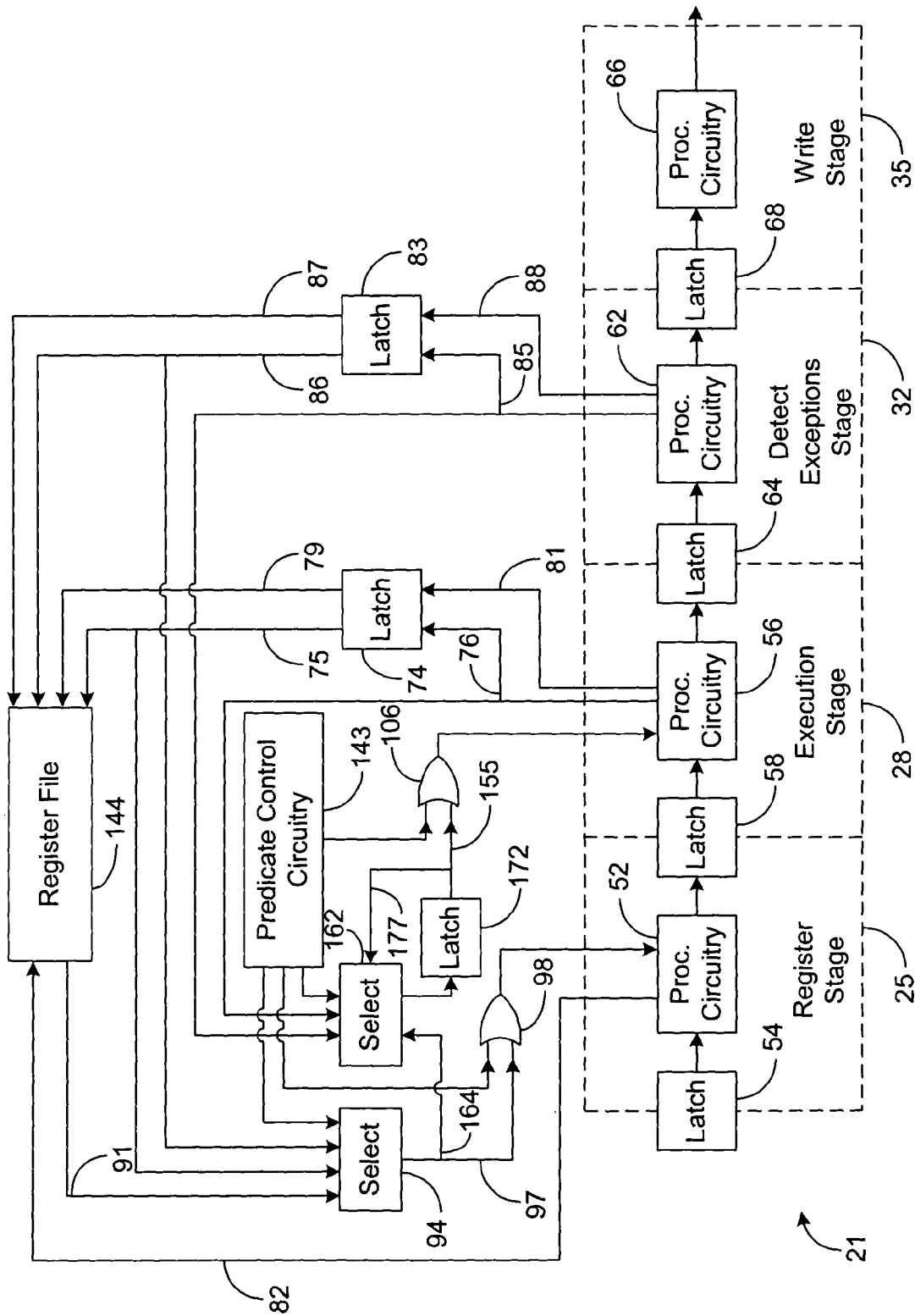
FIG. 6 is a block diagram illustrating a more detailed view of a processing pipeline depicted by FIG. 5.

As shown by FIG. 6, the processing system 110 includes a register file 144, similar to register file 71 of conventional system 15. Although the register file 144 is shown as being coupled to one pipeline 21 in FIG. 6, it should be noted that each pipeline 21 is similarly coupled to the register file 144 in the preferred embodiment.

Figure 7:
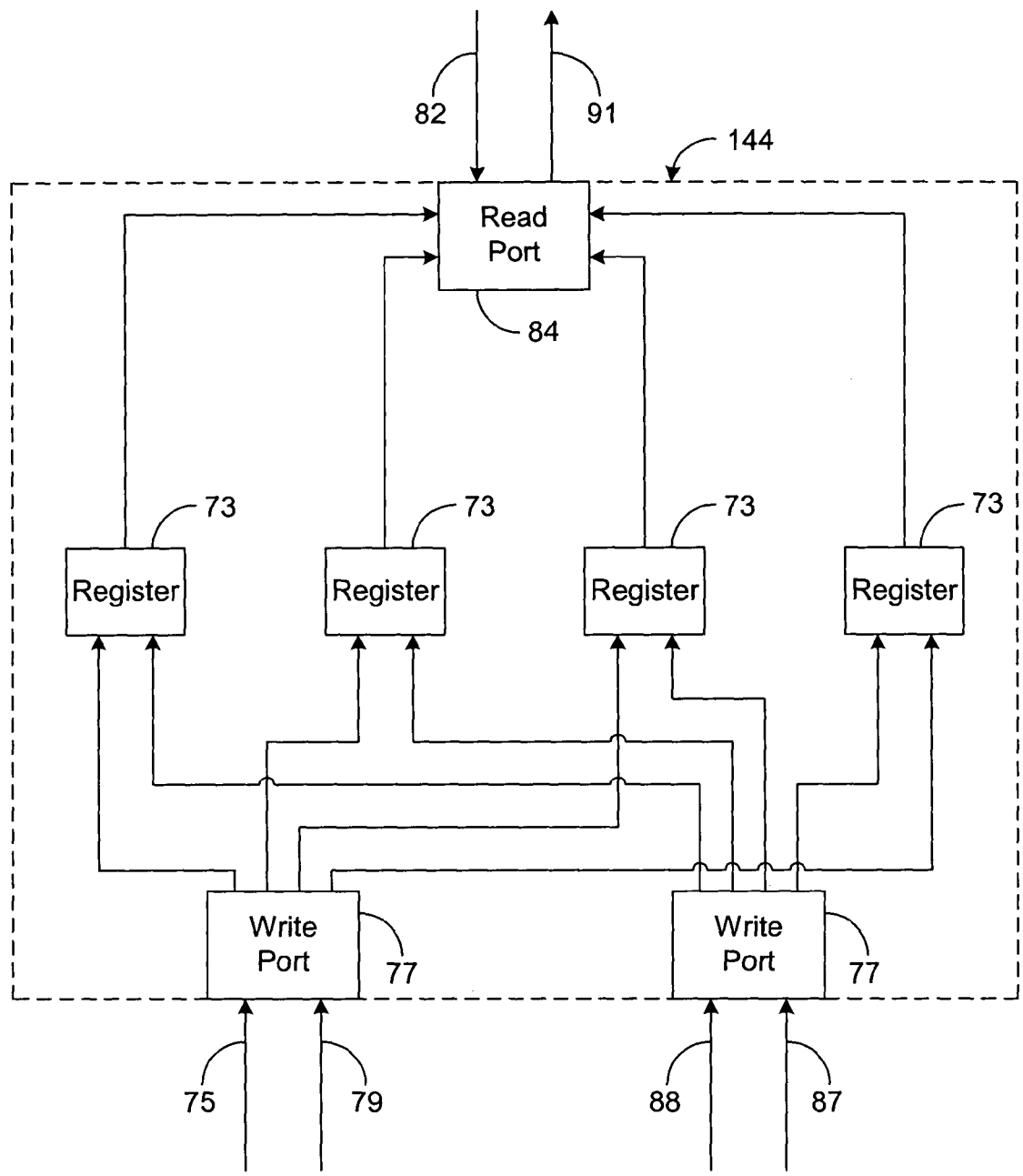
FIG. 7 is a block diagram illustrating a more detailed view of a register file depicted in FIG. 6.

Referring to FIG. 7, the register file 144 includes at least one write port 77 for writing predicate values to registers 73. Although FIG. 7 shows only two write ports 77 for simplicity, the register file 144 preferably includes at least one write port 77 for each stage 25, 28, 32, and/or 35 of each pipeline 21 that may produce predicate values. The register file 144 also includes at least one read port 84 for reading the predicate values contained in the registers 73. However, unlike conventional register file 71, the register file 144 of the preferred embodiment includes only one read port 84 for each pipeline 21. Therefore, the pipeline 21 shown by FIG. 6 is coupled to only one read port 84 in the preferred embodiment. If desired, the pipeline 21 of FIG. 6 can be coupled to more than one read port 84, but multiple read ports 84 undesirably increase the amount of circuitry and the complexity of the circuitry necessary to implement the system 110.

Further, as shown by FIG. 6, the processing system 110 includes latches 54, 58, 64, and 68 that are used to control the timing of the system 110. In this regard, through techniques known in the art, latches 54, 58, 64, and 68 respectively latch and provide instructions to processing circuitry 52, 56, 62, and 66. Similar to conventional system 15, the latches 54, 58, 64, and 68 are preferably controlled such that each of the processing circuitry 52, 56, 62, and 66 in each of the stages 25, 28, 32, and 35 only processes one instruction at a time. Furthermore, the pipeline 21 depicted by FIG. 6 may simultaneously process up to four instructions, one instruction for each of the processing circuitry 52, 56, 62, and 66. However, it may be possible for any of the processing circuitry 52, 56, 62, and/or 66 to simultaneously process more than one instruction at a time in other embodiments.

The processing circuitry 52, when processing an instruction in the register stage 25, may be configured to utilize the predicate value contained in the register 73 (FIG. 7) correlated with the instruction, as described above for conventional system 15. This predicate value is provided to the processing circuitry 52 via the same techniques described above for providing predicate data to the processing circuitry 52 of FIG. 2. In this regard, the predicate register identifier of the instruction is transmitted to the register file 144 via connection 82. The read port 84 (FIG. 7) receives the register identifier and reads the value contained in the register 73 identified by the received identifier. This value is then transmitted to select circuitry 94 via connection 91.

The predicate control circuitry 143, similar to the predicate control circuitry 22 of FIG. 2, is designed to analyze the predicate control register identifiers of the instructions processed by the system 110 and to transmit control signals to select circuitry 94 indicating which value received by the select circuitry 94 should be selected and transmitted. In this regard, the predicate control circuitry 143 transmits at least one control signal to select circuitry 94 that causes the select circuitry 94 to select the value presently received from connection 91, unless a new predicate value being transmitted to the register file 144 via connections 75, 86, and/or other connections from other stages and/or pipelines 21 may affect the predicate status of the instruction in the register stage 25. If a new predicate value presently transmitted to the register file 144 may affect the predicate status of the instruction in the register stage 25, the foregoing control signal from the predicate control circuitry 143 causes the select circuitry 94 to select the new predicate value instead.

The select circuitry 94 transmits the selected value over connection 97 to OR gate 98 and ignores the other values received by the select circuitry 94. In the context of the document, a value is ignored when it is received by circuitry that refrains from further processing the value. Note that the value selected by the select circuitry 94 will be referred to hereafter as the "qualifying register stage predicate value" ($QP_{reg}$)."

A pessimistic control signal from predicate control circuitry 143 is transmitted to OR gate 98 along with $QP_{reg}$. The pessimistic control signal is asserted if the predicate control circuitry 143 detects that another instruction may later produce predicate data that may affect the predicate status of the instruction in the register stage 25. Therefore, the OR gate 98 in system 110 operates the same as in conventional system 15, and the output of the OR gate 98, when asserted, indicates that the instruction in the register stage 25 should be processed as if the instruction is enabled. When deasserted, the output of the OR gate 98 indicates that the instruction in the register stage 25 should be processed as if the instruction is disabled.

As shown by FIG. 6, $QP_{reg}$ is provided to select circuitry 162 via connection 164, which is coupled to connection 97. The select circuitry 162 also receives the new predicate values being transmitted across connections 76, 85 and any other similar connections (not shown) from other stages and/or pipelines 21 (i.e., any other connection transmitting a new predicate value that is about to be latched and provided to the register file 144).

When the instruction in the register stage 25 of the pipeline 21 shown by FIG. 6 is unstalled, the predicate control circuitry 143 transmits a control signal to select circuitry 162 indicating which of the aforementioned values received by select circuitry 162 should be selected and transmitted to latch 172. In this regard, the predicate control circuitry 143 detects whether any of the new predicate values received by the select circuitry 162 (e.g., the values received from connections 76 and 85) are indicative of the predicate status of the instruction presently in the register stage 25. A new predicate value is indicative of the predicate status of the instruction if the new predicate value is destined for the register 73 identified by the instruction's predicate register identifier. For example, if the new predicate value being transmitted across connection 75 is destined for the register 73 identified by the predicate register identifier of the instruction in the register stage 25, then the value received by select circuitry 162 from connection 75 is indicative of the predicate status of the foregoing instruction.

If any one of the new predicate values received by the select circuitry 162 is indicative of the predicate status of the instruction in the register stage 25, the predicate control circuitry 143 transmits a control signal to select circuitry 162 indicating that the one new predicate value should be selected. In response, the select circuitry 162 selects the foregoing new predicate value and transmits this new predicate value to latch 172. If, on the other hand, none of the new predicate values received by the select circuitry 162 is indicative of the predicate status of the instruction in the register stage 25, the predicate control circuitry 143 transmits a control signal to select circuitry 162 indicating that $QP_{reg}$ from connection 164 should be selected, and the select circuitry 162, in response, transmits $QP_{reg}$ to latch 172. The value selected by select circuitry 162 for transmission to latch 172 shall be referred to herein as the "qualifying execution stage predicate value" ($QP_{exe}$).

The latch 172 transmits $QP_{exe}$ to OR gate 106 via connection 155 upon the next active edge of a clock signal. This should be the same active edge upon which the instruction in the register stage 25 enters the execution stage 28. The OR gate 106 also receives a pessimistic control signal from predicate control circuitry 143. The pessimistic control signal is asserted when the predicate control circuitry 143 detects that an instruction in any of the pipelines 21 may produce predicate data that may later affect the predicate status of the instruction presently in the execution stage 28. Therefore, similar to the output by OR gate 98, the output of OR gate 106 is asserted, if the predicate value from latch 172 indicates that the instruction in the execution stage 28 is enabled (i.e., if the predicate value from latch 172 is asserted in the preferred embodiment) or if the pessimistic control signal from predicate control circuitry 143 is asserted. If the output of OR gate 106 is asserted, the processing circuitry 56 is then designed to process the instruction in the execution stage 56 as if the instruction is enabled. Conversely, if the output of OR gate 106 is deasserted, then the processing circuitry 56 is designed to process the instruction in the processing circuitry 56 as if the instruction is disabled.

However, if the instruction in the execution stage 28 is stalled when the select circuitry 162 receives $QP_{reg}$, then the instruction in the register stage 25 should not enter the execution stage 28 on the next edge of the clock signal, and the operation of the system 110 is slightly different than that previously described. In this regard, if the instruction in the execution stage 28 is stalled, then the select circuitry 162 does not select $QP_{reg}$ (i.e., the signal on connection 164), as is possible when the instruction in the execution stage 28 is not stalled. Instead, the select circuitry 162, based on the control signal from predicate control circuitry 143, selects the feedback value presently transmitted across feedback connection 177 or selects one of the new predicate values presently transmitted to the select circuitry 162 from connection 85 or any of the other similar connections (not shown) transmitting a new predicate value that is provided to register file 144 and that is about to be latched from a stage 32 or 35 that is later than the execution stage 28.

In this respect, if one of the foregoing new predicate values is indicative of the predicate status of the instruction in the execution stage 28, the control signal transmitted to the select circuitry 162 from the predicate control circuitry 143 indicates that the one new predicate value should be selected. If there are no such new predicate values transmitted to select circuitry 162, then the control signal transmitted to the select circuitry 162 from the predicate control circuitry 143 indicates that the feedback value on feedback connection 177 should be selected instead.

The select circuitry 162 selects the value indicated by the control signal from the predicate control circuitry 143 and transmits the selected value to the latch 172. This value is then provided to the processing circuitry 56 on the next active edge of the clock signal, unless the pessimistic control signal transmitted from predicate control circuitry 143 affects the output of the OR gate 106. As set forth hereinbefore, the pessimistic control signal is asserted, if the predicate control circuitry 162 detects that an instruction may produce predicate data that may later affect the predicate status of the instruction in the execution stage 28.

As a result, when an instruction is initially stepped into the execution stage 28, $QP_{reg}$ (i.e., the value transmitted across connection 164) is selected and transmitted to OR gate 106, unless a more recent predicate value indicative of the instruction's predicate status is received by select circuitry 162 from connections 76, 85, or other similar connection. If such a new predicate value is received by the select circuitry 162, the new predicate value indicative of the foregoing instruction's predicate status is transmitted to OR gate 106 instead of $QP_{reg}$.

If the instruction becomes stalled while in the execution stage 28, then the foregoing selected value, which was selected when the instruction first stepped into the processing circuitry 56, is continuously selected and transmitted to the OR gate 106 via select circuitry 162, latch 172, and feedback connection 177, unless a more recent predicate value indicative of the instruction's predicate status is received by the select circuitry 162 from connection 85 or other similar connection coupled to a stage 32 or 35 (of any of the pipelines 21) later than the execution stage 28. If such a new predicate value is received by the select circuitry 162, then this new predicate value is transmitted to OR gate 106 instead. The foregoing new predicate value is continuously selected and transmitted to the OR gate 106 via select circuitry 162, latch 172, and feedback connection 177, unless another new predicate value indicative of the instruction's predicate status is received from connection 85 or other similar connection coupled to a stage 32 or 35 (of any of the pipelines 21) later than the execution stage 28.

This process of continuously selecting and transmitting the value from feedback connection 177 unless a more recent predicate value indicative of the instruction's predicate status is received is repeated until the stall on the instruction in the execution stage 28 is removed. Once this occurs, another instruction steps into the execution stage 28, and the entire aforementioned process is repeated for the other instruction. Therefore, OR gate 106 should always receive the most up-to-date available predicate value that is indicative of the predicate status of the instruction in the execution stage 28.

Note that the processing circuitry 56 of the present invention receives from OR gate 106 data indicative of the predicate status of the instruction in the execution stage 28 quicker than the processing circuitry 56 of conventional system 15, since the data of the register file 144 is not actually read by the select circuitry 162 when an instruction is stepped into execution stage 28.

Furthermore, it is possible for each later stage 32 and/or 35 to use the most recent qualifying predicate value ($QP_{xxx}$) selected for the preceding stage to determine the predicate status of the stage's instruction, similar to how $QP_{reg}$ is used by the execution stage 28 to determine the predicate status of the instruction in the execution stage 28. The term $QP_{xxx}$ refers the qualifying predicate value selected by any stage 25, 28, 32, or 35, and, therefore, may refer to $QP_{reg}$, $QP_{exe}$, $QP_{det}$, or $QP_{wrt}$. Since stages 28, 32, and 35 may utilize the qualifying predicate value selected for the respective preceding stage 25, 28, and 32, it is necessary for only one stage 25, 28, 32, or 35 of the pipeline 21 to actually read the register file 144. The rest of the later stages, if any, may utilize the data derived from the results read by the one stage 25, 28, 32, or 35. Accordingly, only one stage 25, 28, 32, or 35 needs to be coupled to a read port 84 of the register file 144, thereby reducing the number of read ports 84 in the register file 144. This can significantly decrease the cost and complexity of implementing the system 110.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A computer system for processing instructions of computer programs, comprising:

a register;

a pipeline configured to execute instructions of a computer program, said pipeline having a first stage and a second stage; and circuitry configured to read a first predicate value from said register and to receive a second predicate value, said circuitry configured to transmit, to said first stage, said first predicate value and to select between at least said second predicate value and said first predicate value read from said register, said circuitry further configured to transmit said selected predicate value to said second stage, said circuitry further configured to detect whether an instruction in said second stage is stalled and to select said selected predicate value based on whether said instruction in said second stage is stalled.

2. A computer system, comprising:

a register;

a pipeline configured to execute instructions of a computer program, said pipeline having a first stage and a second stage;

first circuitry coupled to said register and to said first stage, said first circuitry configured to simultaneously receive a first plurality of predicate values, at least one of said first plurality of predicate values received from said register and each of said first plurality of predicate values associated with one of said instructions, said first circuitry configured to select a predicate value among said first plurality of simultaneously received predicate values, said first circuitry further configured to transmit said predicate value selected among said first plurality of predicate values to said first stage and across a connection; and second circuitry coupled to said connection and to said second stage, said second circuitry configured to simultaneously receive a second plurality of predicate values, said second plurality of predicate values including said predicate value transmitted across said connection and each of said second plurality of predicate values associated with said one instruction, said second circuitry configured to select a predicate value among said second plurality of simultaneously received predicate values and to transmit, to said second stage, said predicate value selected among said second plurality of predicate values.

3. The system of claim 2, wherein said second circuitry includes a latch configured to receive said predicate value selected among said second plurality of predicate values and to transmit said predicate value received by said latch in response to an edge of a clock signal.

4. The system of claim 3, wherein said second plurality of predicate values includes an output value of said latch.

5. The system of claim 2, wherein one of said second plurality of predicate values is transmitted from another pipeline.

6. The system of claim 2, further comprising control circuitry configured to compare register identifiers defined by said instructions and to transmit control signals to said first and second circuitry, wherein said first circuitry is configured to select said predicate value selected among said first plurality of predicate values based on at least one of said control signals and said second circuitry is configured to select said predicate value selected among said second plurality of predicate values based on at least one of said control signals.

7. A method for processing instructions of computer programs, comprising the steps of:
provuding a pipeline having a first stage and a second stage;
producing a predicate value;
writing said predicate value to a register;
receiving an instruction;
receiving a control signal;
reading said predicate value from said register based on a register identifier included in said instruction;
transmitting said predicate value read from said register in said reading step to said first stage of said pipeline;
processing said instruction via said first stage of said pipeline based on said predicate value transmitted to said first stage;
receiving a new predicate value;
selecting, based on said control signal, between said new predicate value and said predicate value read from said register in said reading step;
transmitting said predicate value selected in said selecting step to said second stage of said pipeline; and
processing said instruction via said second stage based on said predicate value selected in said selecting step.

8. The method of claim 7, wherein said one predicate value selected in said selecting step is said predicate value read in said reading step.

9. The method of claim 7, wherein said predicate value selected in said selecting step is said new predicate value, said selecting step further including the step of ignoring said predicate value read in said reading step.

10. The method of claim 7, further comprising the steps of:
detecting whether said new predicate value is indicative of a predicate status of said instruction; and
performing said selecting step based on said detecting step.

11. The method of claim 7, further comprising the steps of:
receiving a second new predicate value;
selecting between said second new predicate value and said value transmitted to said second circuitry;
detecting that said instruction is stalled; and
performing said selecting between said second new predicate value step in response to said detecting step.

12. A method for processing instructions of computer programs, comprising the steps of:
providing a pipeline having a first stage and a second stage;
reading a predicate value from a register;
simultaneously receiving a first plurality of predicate values, said first plurality of predicate values including said predicate value read from said register;
selecting a predicate value among said first plurality of simultaneously received predicate values;
transmitting, to said first stage of said pipeline, said predicate value selected in said selecting one of said first plurality of predicate values;
processing an instruction in said first stage of said pipeline based on said predicate value transmitted to said first stage;
simultaneously receiving a second plurality of predicate values, said second plurality of predicate values including said predicate value selected among said first plurality of predicate values, each of said second plurality of predicate values associated with said instruction;
selecting a predicate value among said second plurality of predicate values;
transmitting said predicate value selected among said second plurality of predicate values to said second stage of said pipeline; and
processing said instruction in said second stage of said pipeline based on said predicate value transmitted to said second stage.

13. A computer system for processing instructions of computer programs, comprising:
a register;
a pipeline configured to execute instructions of a computer program, said pipeline having a first stage and a second stage; and
circuitry configured to read a first predicate value from said register and to receive a second predicate value, said circuitry configured to transmit, to said first stage, said first predicate value and to select between at least said second predicate value and said first predicate value read from said register, said circuitry further configured to transmit said selected predicate value to said second stage, wherein said circuitry includes a latch that is configured to receive said selected predicate value and to transmit said selected predicate value to said second stage in response to an edge of a clock signal, and wherein second predicate value is received by said circuitry from another latch.

14. A computer system for processing instructions of computer programs, comprising:
a register;
a pipeline configured to execute instructions of a computer program, said pipeline having a first stage and a second stage; and
circuitry configured to read a first predicate value from said register and to receive a second predicate value, said circuitry configured to transmit, to said first stage, said first predicate value and to select between at least said second predicate value and said first predicate value read from said register, said circuitry further configured to transmit said selected predicate value to said second stage, wherein said circuitry includes a latch that is configured to receive said selected predicate value and to transmit said selected predicate value to said second stage in response to an edge of a clock signal, and wherein said second predicate value is received by said circuitry from said latch.

15. A system for processing instructions of computer programs, comprising:
a pipeline configured to execute an instruction of a computer program, said pipeline having a first stage and a second stage;
first circuitry configured to read a first predicate value from a register and to select one predicate value among a first plurality of predicate values, said first plurality of predicate values including said first predicate value read from said register, said first circuitry further configured to transmit, to said first stage, the value selected by said first circuitry; and second circuitry configured to receive, from said first circuitry, said value selected by said first circuitry, said second circuitry configured to select one predicate value among a second plurality of predicate values, said second plurality of predicate values including said value selected by said first circuitry, said second circuitry further configured to transmit, to said second stage, the value selected by said second circuitry, wherein said first stage is configured to process said instruction based on said first predicate value transmitted to said first stage, and wherein said second stage is configured to process said instruction based on said selected predicate value.

16. The system of claim 15, wherein said circuitry comprises a latch configured to receive said selected predicate value and to output said selected predicate value based on a clock signal, and wherein said plurality of predicate values includes an output value of said latch.

* * * * *

UNITED STATES PATENT AND TRADEMARK OFFICE
CERTIFICATE OF CORRECTION

| | |
|---|---|
| PATENT NO. | : 7,213,132 B2 |
| APPLICATION NO. | : 10/648960 |
| DATED | : May 1, 2007 |
| INVENTOR(S) | : Gary J. Benjamin et al. |

It is certified that error appears in the above-identified patent and that said Letters Patent is hereby corrected as shown below:

On the title page, item (56), under "Other Publications", in column 2, line 8, delete "1007" and insert -- 1997 --, therefor.

Signed and Sealed this

Twenty-sixth Day of August, 2008

JON W. DUDAS
*Director of the United States Patent and Trademark Office*